United States Patent
Fisch et al.

(10) Patent No.: US 6,314,634 B1
(45) Date of Patent: Nov. 13, 2001

(54) PROCESS AND DEVICE FOR FITTING WHEEL HEADS OR THE LIKE

(75) Inventors: Torsten Fisch, Aichwald; Kurt Lay, Rottenburg; Wolfgang Pfundstein, Stuttgart; Dieter Schulte, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/142,377

(22) PCT Filed: Feb. 3, 1997

(86) PCT No.: PCT/EP97/00477

§ 371 Date: Sep. 4, 1998

§ 102(e) Date: Sep. 4, 1998

(87) PCT Pub. No.: WO97/32773

PCT Pub. Date: Sep. 12, 1997

(30) Foreign Application Priority Data

Mar. 6, 1996 (DE) .............................................. 196 08 577

(51) Int. Cl.$^7$ ...................................................... B23Q 3/00
(52) U.S. Cl. .............................. 29/467; 29/273; 29/281.1; 29/281.4; 29/281.5; 29/468
(58) Field of Search .............................. 29/467, 468, 273, 29/281.1, 281.4, 281.5, 802, 783, 771, 784, 786, 791, 793, 799, 824

(56) References Cited

U.S. PATENT DOCUMENTS

| | | | |
|---|---|---|---|
| 3,694,890 | * 10/1972 | Arning et al. | 29/467 |
| 4,103,531 | * 8/1978 | Daniel . | |
| 4,658,501 | * 4/1987 | Fujii et al. | 29/824 |
| 4,805,286 | * 2/1989 | Uchida et al. | 29/469 |
| 4,827,598 | * 5/1989 | Sakamoto et al. | 29/783 |
| 4,893,402 | * 1/1990 | Hirasaka et al. | 29/784 |
| 4,894,909 | * 1/1990 | Sakamoto et al. | 29/802 |
| 4,918,821 | * 4/1990 | Bjork . | |
| 4,928,386 | * 5/1990 | Schupp et al. | 29/824 |
| 5,027,502 | * 7/1991 | Sakamoto et al. | 29/783 |

FOREIGN PATENT DOCUMENTS

| | | | |
|---|---|---|---|
| 36 32 477 | 4/1988 | (DE) . | |
| 2 193 693 | 2/1988 | (GB) . | |
| 2204840 | * 11/1988 | (GB) | 29/802 |

* cited by examiner

*Primary Examiner*—S. Thomas Hughes
*Assistant Examiner*—Essama Omgba
(74) *Attorney, Agent, or Firm*—Crowell & Moring LLP

(57) ABSTRACT

The invention concerns a process and device for fitting wheel heads on a vehicle chassis. The chassis and wheel head are first brought into a reference position relative to one another. Wheel guide elements which have not yet been finally fitted are used to determine the securing positions for the reference position and secured.

6 Claims, 1 Drawing Sheet

PROCESS AND DEVICE FOR FITTING WHEEL HEADS OR THE LIKE

BACKGROUND AND SUMMARY OF THE INVENTION

The invention relates to a method and a device for mounting wheelheads or wheelcarriers on a chassis or part chassis of a vehicle, in particular during the production of the vehicle. The terms "chassis" and "part chassis" also refer here to self-supporting bodies or part bodies.

In vehicles with individual wheel suspensions, the wheelheads supporting the wheels are guided by more or less complicated guide members. These are, for example, longitudinal and/or transverse links and/or telescopic struts which are fastened to the wheelhead and/or to the chassis in an articulated or movable manner. In order to ensure a high degree of driving safety, the guide members must be mounted in such a way that the desired position of the wheels, particularly as regards camber and caster, is assumed as accurately as possible. An undesirably high outlay has hitherto been necessary for this purpose, in order to ensure that the requisite desired position is assumed in spite of a large number of parts which interact with one another and have tolerances.

To this end, there may be provisions for machining the bearings of the guide members with very high accuracy and predetermining very narrow tolerances for the guide members themselves.

Alternatively, there may be provisions for equipping the guide members or their bearings with adjusting devices, so that, after the wheelheads and guide members have been mounted on the chassis, the adjustment of the wheels or wheelheads, which is still necessary then, can be carried out.

Both methods are very costly.

DE 36 32 477 C2 discloses a measurement and arrangement method for arranging and fastening attachment parts to automobile bodies. Moreover, corresponding devices are illustrated. According to this publication, the body, including the position of the side wall cutouts or the contact points for attachment parts, is measured in a separate measuring station. The body subsequently passes into a mounting station, in which first the position of the body is determined accurately and then the doors or attachment parts are applied with an exact fit, using handling machines.

The object of the invention, then, is to simplify the mounting of wheelheads or wheelcarriers and, in particular, the adjustment of these during the production of a vehicle.

This object is achieved, according to the invention, in that the chassis or part chassis and the wheelhead or wheelcarrier to be mounted are oriented in a desired position relative to one another by means of a handling device. A main guide member is ready-mounted between the wheelhead or wheelcarrier. The chassis or part chassis is used for predetermining a parameter or set of parameters of the desired position. Guide members mounted previously on the wheelhead or wheelcarrier serve for connecting between the wheelhead or wheelcarrier and the chassis or part chassis in order to determine chassis-side fastening positions assigned to the desired position. The guide members are fastened there.

The invention is based on the general notion of accepting manufacturing tolerances and compensating them by locating fastening positions suitable for this purpose, using the guide members, already mounted on the wheel, as a mounting gage or mounting aid, after the wheelhead and chassis have been accurately aligned. As a result, different positions for fastening the guide members to the chassis are then obtained for each running gear according to the respective tolerance compensation, specifically in such a way that, when the wheelheads are in a predetermined normal position relative to the chassis, the desired values for track, camber and caster are achieved accurately without any further measures.

In this case, the invention makes use of the fact that, due to the current state of the art with regard to handling devices, the desired position of the wheelhead and chassis can be set with very high accuracy and with moderate cost before the associated fastening positions are determined.

According to a particularly preferred embodiment of the invention, the guide members are fastened to the chassis at elongated holes present there, specifically at the fastening positions which are predetermined by the respective guide member when the chassis and wheelhead are in the desired position.

Instead, it is also possible to predetermine, on the chassis, only a usually linearly narrow region for fastening holes or elements and, with the aid of the guide members to be mounted, to determine, within these predetermined regions, the fastening position assigned to the desired position of the chassis and wheelhead and then arrange the fastening hole or fastening element accurately there.

Moreover, as regards preferred features of the invention, reference is made to the claims and to the following explanation of the drawing, by means of which particularly expedient embodiments are described.

DETAILED DESCRIPTION OF THE DRAWINGS

Figure 1:
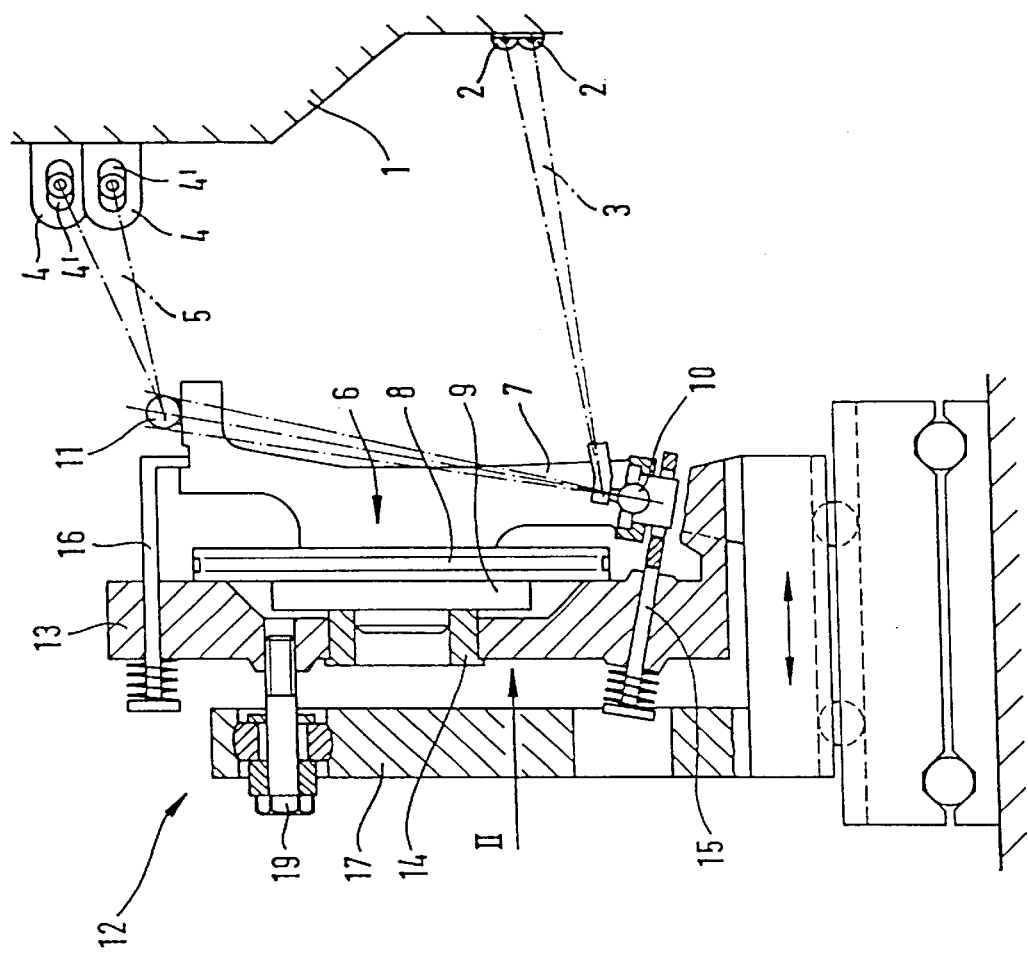
FIG. 1 shows a diagrammatic sectional illustration of the handling device during the mounting of an upper transverse link of a wheel on the chassis in the longitudinal direction of said chassis.
Figure 2:
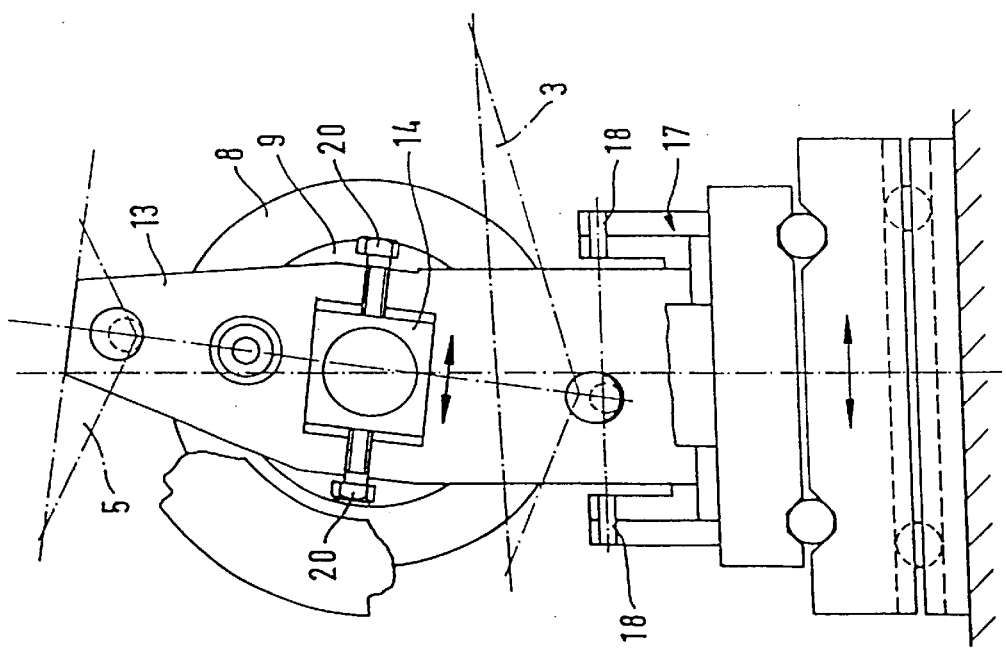
FIG. 2 shows a diagrammatic view of the handling device according to the arrow II in FIG. 1.

According to FIGS. 1 and 2, front and rear connection points 2 for a lower transverse link 3 and front and rear connection points 4 for an upper transverse link 5 are arranged on a chassis 1, indicated merely diagrammatically, so that the transverse links 3 and 5 can be connected to the chassis so as to be pivotable in the upward or downward direction. Those ends of the transverse links 3 and 5 which are remote from the chassis are connected in an articulated manner to a wheelhead 6 which, in the example illustrated, comprises a steering knuckle 7 connected in an articulated manner to the transverse links 3 and 5, a brake disk 8 and a fastening flange 9 for a vehicle wheel.

During the production of the vehicle, first only the lower transverse link 3, which also transmits the forces of a spring, not illustrated, between the chassis 1 and the wheel or wheelhead 6, is ready-mounted, that is to say the lower transverse link 3 is connected, on the one hand, in an articulated manner to the connection points 2 of the chassis 1 and, on the other hand, to the lower ball joint 10 of the steering knuckle 7.

The upper transverse link 5 is first connected only to the upper ball joint 11 of the steering knuckle 7 in an articulated manner.

During or after this mounting work, the wheelhead 6 is grasped by means of a device 12, explained further below, and is subsequently brought into a predetermined position relative to the chassis 1. The upper transverse link 5 is then connected to the upper connection points 4 of the chassis 1. These connection points 4 are provided with elongated holes 4', in such a way that it is possible for the pivot bearings of the upper transverse link 5 to be fastened within a region predetermined by the length of the elongated holes 4'. Since the device 12 retains the wheelheads 6 in a desired position relative to the chassis 1, the mounting of the pivot bearings of the upper transverse link 5 to the elongated holes 4' can take place only when the upper transverse link 5 is in the position assigned to the abovementioned desired position, that is to say in that position in which all tolerances of the parts determining the arrangement of the wheelhead 6 are optimally compensated for.

If appropriate, the joints of the upper transverse link 5 which are assigned to the chassis 1 may also be connected, initially loosely and displaceably, to the upper connection points 4. It is important that the position of these joints at the upper connection points 4 or the elongated holes 41 is fixed only when the device 12 has brought the wheelhead 6 into a predetermined position relative to the chassis 1.

The device 12 possesses a wheelhead receptacle 13 having a hub centering portion 14, the latter cooperating with an axle pin or centering pin on the flange 9 of the wheelhead 6. By means of lower and upper clamping members 15 and 16, on the one hand, the housing of the lower wheel-side ball joint 10 of the lower transverse link 3 and, on the other hand, a predetermined part on the upper portion of the steering knuckle 7 are grasped, in such a way that, with the centering or axle pin of the wheelhead 6 being pushed into the hub centering portion 14, said wheelhead is brought into an end position and is held therein.

The wheelhead receptacle 13 is retained on a stand 17 so as to be pivotably adjustable. In the example illustrated, pivot bearings 18 are arranged in such a way that the wheelhead receptacle 13 can tilt about an axis passing through the center of the wheel-side lower ball joint 10 and essentially parallel to the longitudinal axis of the chassis 1, the amount of tilt being capable of being set by means of a setscrew 19.

The hub centering portion 14 can be displaced by means of setscrews 20 in a direction parallel to the axis of the pivot bearings 18 or in a direction having a component parallel to the abovementioned pivot axis.

Moreover, the stand is movable in the longitudinal and transverse directions of the chassis 1. Furthermore, there may be provision for causing the stand 17 and/or the wheelhead receptacle 13 to pivot about a vertical axis which preferably passes through the center of the lower ball joint 10.

By appropriately adjusting the setscrew 19 and due to the associated tilting of the wheelhead receptacle 13 about the axis of the pivot bearings 18, the spreading angle of the wheelhead 6 is predetermined, that is to say-the angle between a vertical longitudinal plane of the chassis 1 and an axis passing through the centers of the ball joints 10 and 11.

Adjusting the setscrews 20 predetermines the caster angle, that is to say the angle between the axis passing through the centers of the ball joints 10 and 11 and a vertical transverse plane of the chassis 1.

By setting the pivoting of the wheelhead receptacle 13 or of the parts carrying it about a vertical axis, it is possible, if appropriate, to set the toe-in of the wheelhead 6.

What is claimed is:

1. A method of mounting a wheel head having a first guide element and at least one additional guide element on a chassis of a vehicle when manufacturing the vehicle, the method comprising the acts of:

mounting the first guide element between the wheel head and the chassis;

aligning the wheel head and chassis relative to one another in a desired position with specified toe-in, camber and caster values, wherein the position of said mounted first guide element is used to fix a distance parameter of the desired position; and using said at least one additional guide element, previously mounted on the wheel head, to determine its chassis-side fastening position assigned to the desired position; and fastening said at least one additional guide element on the chassis in the fastening position.

2. The method according to claim 1, further comprising the act of clamping, via a handling device, a wheel-side element on said first guide element.

3. The method according to claim 2, wherein said wheel-side element is a ball joint.

4. The method according to claim 1, wherein the act of fastening the at least one additional guide element uses elongate holes present at the fastening position on the chassis.

5. The method according to claim 1, further comprising the act of arranging one of fastening elements and holes at the fastening position on the chassis determined by said at least one additional guide element.

6. A method for mounting wheel heads on a chassis of a vehicle, comprising the acts of:

orienting the chassis and the wheel head to be mounted relative to one another by a handling device:

mounting a main guide member between the wheel head and the chassis;

using said main guide member to fix at least one distance parameter of the desired position;

using previously mounted guide members connected between the wheel head and the chassis in order to determine the chassis side fastening positions assigned to the desired positions;

fastening said guide members on the chassis in the fastening positions.

* * * * *